(12) United States Patent
Agardy et al.

(10) Patent No.: US 7,398,867 B2
(45) Date of Patent: Jul. 15, 2008

(54) AZIMUTH BRAKE FOR WIND POWER SYSTEMS

(75) Inventors: Gabor-Josef Agardy, Herford (DE); Jürn Edzards, Schloss Holte-Stukenbrock (DE)

(73) Assignee: Hanning & Kahl GmbH & Co. KG, Oerlinghausen (DE)

( * ) Notice: Subject to any disclaimer, the term of this patent is extended or adjusted under 35 U.S.C. 154(b) by 18 days.

(21) Appl. No.: 10/572,789

(22) PCT Filed: Sep. 2, 2004

(86) PCT No.: PCT/EP2004/009763

§ 371 (c)(1),
(2), (4) Date: Mar. 21, 2006

(87) PCT Pub. No.: WO2005/038286

PCT Pub. Date: Apr. 28, 2005

(65) Prior Publication Data

US 2007/0068742 A1    Mar. 29, 2007

(30) Foreign Application Priority Data

Sep. 23, 2003 (DE) .............................. 203 14 822 U

(51) Int. Cl.
*F16D 55/08* (2006.01)

(52) U.S. Cl. .................................... 188/72.9; 188/18 A

(58) Field of Classification Search ............... 188/18 A, 188/46, 58, 72.1, 72.6, 72.9, 73.2, 73.34; 290/44
See application file for complete search history.

(56) References Cited

U.S. PATENT DOCUMENTS

| 1,858,973 | A | * | 5/1932 | Steele | 188/70 B |
| 2,325,596 | A | * | 7/1943 | Evans | 188/71.7 |
| 2,616,540 | A | * | 11/1952 | Miller | 192/70.252 |
| 2,768,710 | A | * | 10/1956 | Butler | 188/72.5 |
| 3,024,873 | A | * | 3/1962 | Wilkinson | 188/71.7 |
| 4,068,131 | A | | 1/1978 | Jacobs et al. | |
| 4,483,204 | A | * | 11/1984 | Warsaw | 73/862.12 |
| 4,513,839 | A | * | 4/1985 | Nieminski et al. | 180/253 |
| 5,660,250 | A | * | 8/1997 | Treude | 188/72.9 |
| 2005/0034937 | A1 | * | 2/2005 | Agardy et al. | 188/72.9 |

FOREIGN PATENT DOCUMENTS

| DE | 35 16 821 |   | 11/1986 |
| DE | 43 05 285 |   | 6/1994 |
| DE | 202 03 794 |   | 7/2003 |
| EP | 1 167 755 |   | 6/2001 |
| GB | 2004607 A | * | 4/1979 |
| GB | 2074261 A | * | 10/1981 |

* cited by examiner

*Primary Examiner*—Xuan Lan Nguyen
(74) *Attorney, Agent, or Firm*—Richard M. Goldberg

(57) ABSTRACT

Azimuth brake for wind power plants, includes at least two pairs of brake shoes arranged at a common brake disk and each having an actuator associated therewith. Each actuator includes a lever that is pivotable about an axis extending normal to the plane of the brake disk, and a transmission for translating the pivotal movement of the lever into an axial engaging movement of the brake shoes against the brake disk. The levers of at least two actuators are coupled by a common drive mechanism.

9 Claims, 1 Drawing Sheet

AZIMUTH BRAKE FOR WIND POWER SYSTEMS

BACKGROUND OF THE INVENTION

The invention relates to an azimuth brake for wind power plants, comprising at least two pairs of brake shoes arranged at a common brake disk and each having an actuator associated therewith.

Wind power plants have a pod, which carries the blade rotor and is rotatable about a vertical axis, so that the blade rotor may be directed into the wind. The azimuth brake has the purpose to fix the pod in its respective azimuth position and/or to dampen the rotary movement of the pod. The azimuth brake has a horizontal annular brake disk at which several pairs of brake shoes, e.g. 4 to 24 pairs of brake shoes, are arranged, so that a sufficiently high braking force may be exerted onto the brake disk. In conventional azimuth brakes of this type, the brake shoes are actuated hydraulically.

For the blade rotor of a wind power plant, DE 202 03 794 U proposes a brake which can be actuated electromechanically. The actuator of this brake comprises a lever that is pivotable about an axis extending normal to the plane of the brake disk, and a transmission for translating the pivotal movement of this lever into an axial engaging movement of the brake shoes against the brake disk. For actuating the brake, a drive mechanism, which is preferably an electromechanical drive mechanism, e.g. a motor with spindle drive, acts upon the lever. A high engaging force of the brake shoes is achieved by the lever action of the lever and the force translation in the transmission.

SUMMARY OF THE INVENTION

It is an object of the invention to provide an azimuth brake of the type indicated above, which has a simpler construction.

According to the invention, this object is achieved by the features that each actuator comprises a lever that is pivotable about an axis normal to the plane of the brake disk, and a transmission for translating the pivotal movement of the lever into an axial engaging movement of the brake shoes against the brake disk, and the levers of the at least two actuators are coupled by a common drive mechanism.

This solution has the advantage that only a single drive mechanism is needed for the actuators for two pairs of brake shoes. The levers of the two actuators that are coupled by the common drive mechanism are simultaneously pivoted by means of this drive mechanism. In this way, the construction can be simplified considerably.

As with the brake disclosed in 202 03 794 U, the lever action and the transmission provide a high power gain, so that a comparatively weak electromechanical drive mechanism, e.g. a motor with spindle drive, a linear motor or the like can be used as drive mechanism.

Useful details of the invention are indicated in the dependent claims.

The drive mechanism can be coupled to the two levers in such a way that the levers are pivoted in opposite sense. Then, each lever may at the same time serve as a counter bearing for the drive mechanism for adjusting the lever of the other actuator.

In a modified embodiment, the levers may also be pivoted in the same sense.

The levers may also be configured as toothed segments which mesh with a common gear of the drive mechanism. When this gear is arranged centrally, it is also possible to actuate more than two or even all pairs of brake shoes with a common drive mechanism.

Preferably, the two brake shoes of each pair are supported in a saddle that is rigidly mounted at the periphery of the angular brake disk, preferably at the inner periphery thereof, and has the transmission integrated therein. Preferably, the levers of the two actuators that are associated with a common drive mechanism project from their respective saddles in the same direction, e.g. radially inwardly relative to the brake disk. By the common drive mechanism, which draws the free ends of the levers together or presses them apart, both levers are thus pivoted in opposite sense. Correspondingly, the two transmissions are arranged mirror-symmetrically, so that the pivotal movement of the lever is in both cases translated into an engaging movement of the brake shoes.

As an alternative, however, a construction is conceivable wherein the two levers project from their saddles in opposite directions, e.g. one inwardly and one outwardly, so that the levers are pivoted in the same rotary sense when their free ends are drawn together or pressed apart by the common drive mechanism. In this case, the two transmissions may have an identical configuration, e.g. as spindle drives or ball spindle drives with right-handed spindle threading.

In a modified embodiment, it is also possible that each actuator has a spring pack which biases the brake shoes against the brake disk, whereas the lever and the transmission are configured to remove the brake shoes from the brake disk against the force of this spring pack. This construction provides an improved fail-safeness of the brake.

An embodiment example of the invention will now be described in conjunction with the drawings, wherein:

DETAILED DESCRIPTION

Figure 1:
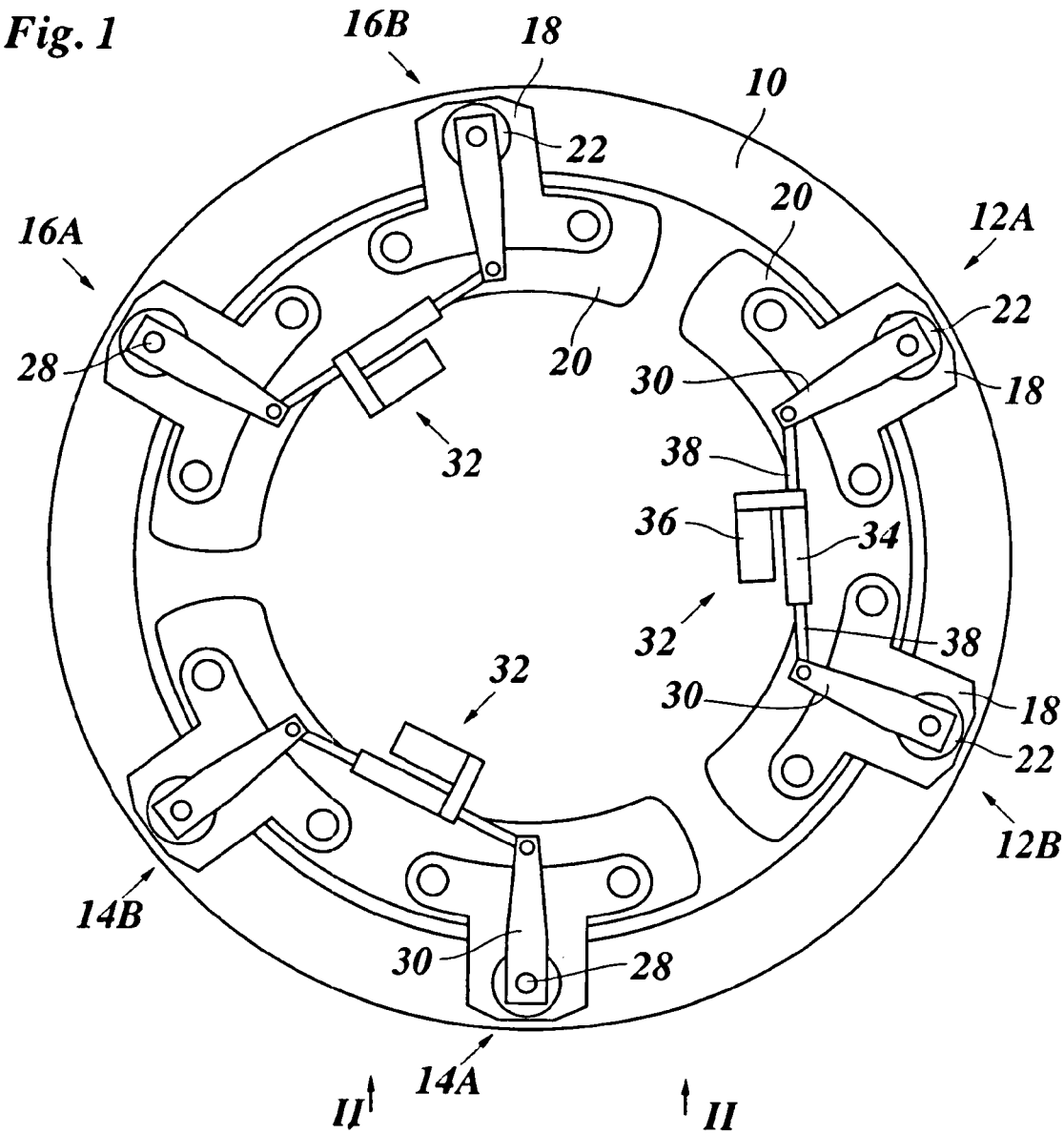
FIG. 1 is a schematic plan view of an azimuth brake according to the invention.

The brake shown in FIG. 1 has an annular brake disk 10 which, as is known per-se and not shown herein, is rigidly connected to a rotatable pod of a wind power plant, and which, in the example shown, it is engaged by six pairs of brake shoes 12A, 12B, 14A, 14B and 16A, 16B. Each pair of brake shoes has a saddle 18 which, by means of a bracket 20, is held rigidly on a member connected to the tower of the wind power plant so as to be stationary in the direction of rotation of the brake disk 10. Of course, a reverse arrangement is possible, wherein the brake disk is held stationary at the tower and the brackets are rotatable together with the pod.

Figure 2:
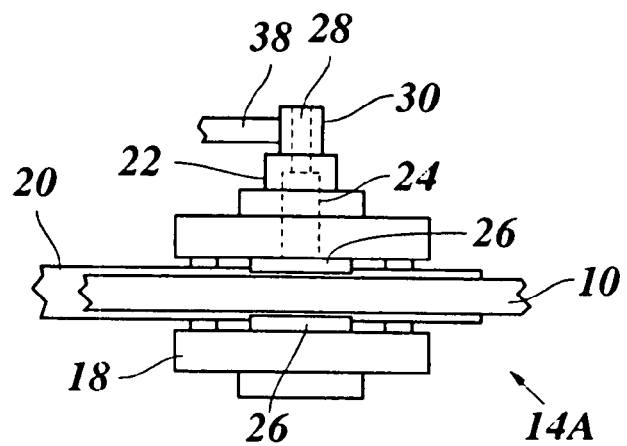
FIG. 2 is a side elevation of a part of the brake as seen in the direction of arrows II-II in FIG. 1.

Each saddle 18 comprises a transmission housing 22 which accommodates a transmission 24 (FIG. 2) for translating a rotary movement into a linear movement. By means of the transmission 24 which may for example be a spindle drive, a ball spindle drive or a spindle screw drive with planetary rollers, two brake shoes 26 of the corresponding pair of brake shoes are pressed against the brake disk 10 from opposite sides so as to exert a braking force onto the brake disk. The transmission 24 has a central input shaft 28 which projects out of the transmission housing 22 and from which a lever 30 projects radially inwardly relative to the brake disk 10. Thus, by pivoting the lever 30, the pair of brake shoes can be shifted between an active and an inactive position, i.e., the lever 30 together with the transmission 24 forms an actuator for the corresponding pair of brake shoes.

The levers 30 of two pairs of brake shoes, such as the pairs of brake shoes 12A and 12B, are coupled to one another by a common electromechanical drive mechanism 32. In the example shown, the drive mechanism 22 is formed by a spindle drive 34 and an electric motor 36 associated therewith. Two push rods 38, that are each pivotally connected to the free end of one of the levers 30, extend from the spindle drive 34. When the spindle drive 34 is driven by the electric motor 36, the push rods 38 are withdrawn in opposite directions, so that the levers 30 associated therewith are pivoted in opposite rotary directions. The two transmissions 24 associated therewith are configured mirror-symmetrically, so that the pivotal movement of the lever 30 will in both cases cause the brake shoes 26 to be axially forced against the brake disk 10. In this way, two respective pairs of brake shoes 12A and 12B, 14A and 14B, 16A and 16B are actuated simultaneously by a single drive mechanism 32.

In the example shown, the saddles 18 of the two pairs of brake shoes that are coupled by a common drive mechanism 32 are also fastened on a common bracket 20 by means of bolts.

Since, in the example shown, the levers 30 project inwardly relative to the brake disk 10, the complete drive system for the azimuth brake can be accommodated within the footprint of the brake disk 10.

In the example shown, the saddles 18 are configured as floating saddles. However, a construction with fixed saddles is also possible, with actuators that each actuate one of the brake shoes 26 being arranged on both sides of the brake disk 10. Again, the levers of these actuators may be coupled by a common drive mechanism.

Although the invention has been described here for an azimuth brake for wind power plants as an example, it will be understood that the principle of the invention is also applicable for other brakes wherein at least two pairs of brake shoes are arranged at a common brake disk.

The invention claimed is:

1. Azimuth brake for wind power plants, comprising:
    at least two pairs of brake shoes adapted to be arranged at a common brake disk and each having an actuator associated therewith, each actuator including:
        a lever that is adapted to be pivotable about an axis extending normal to a plane of the brake disk, and
        a transmission for translating the pivotal movement of the lever into an axial engaging movement of the brake shoes against the brake disk, and
    a common drive mechanism for coupling the levers of the actuators of said at least two pairs of brake shoes, said common drive mechanism including a first element engaged with one lever and which moves in a first direction to pivot the one lever and a second element engaged with the other lever and which moves in a second direction opposite to the first direction to pivot the other lever such that each lever will simultaneously act as a counter bearing for the drive mechanism for adjusting the other lever.

2. Azimuth brake according to claim 1, wherein each pair of brake shoes has a saddle with the transmission being integrated therein.

3. Azimuth brake according to claim 2, wherein the saddles of the at least two pairs of brake shoes, that are associated with a common drive mechanism, are held on a common bracket.

4. Azimuth brake according to claim 1, wherein said common drive mechanism comprises two push rods as said first and second elements that are extendable and retractable in opposite directions and are each pivotally connected to a free end of one of the levers.

5. Azimuth brake according to claim 4, wherein the brake shoes are adapted to be adjusted against the brake disk by retracting the push rods.

6. Azimuth brake according to claim 1, wherein the levers of the two actuators project in a same radial direction relative to the brake disk and the transmissions associated therewith operate in opposite senses.

7. Azimuth brake according to claim 6, wherein the levers project radially inwardly relative to the brake disk.

8. Azimuth brake according to claim 1, wherein said common drive mechanism comprises a spindle drive.

9. Azimuth brake according to claim 1, wherein said common drive mechanism comprises an electric motor.

* * * * *